(12) United States Patent
Zhou

(10) Patent No.: US 10,596,978 B2
(45) Date of Patent: Mar. 24, 2020

(54) WINDOW MOUNTED WIRELESS TERMINAL APPARATUS

(71) Applicant: KZ BROADBAND TECHNOLOGIES, LTD, Shenzhen, Guangdong (CN)

(72) Inventor: Zongyi Zhou, Guangdong (CN)

(73) Assignee: KZ BROADBAND TECHNOLOGIES, LTD, Shenzhen (CN)

( * ) Notice: Subject to any disclaimer, the term of this patent is extended or adjusted under 35 U.S.C. 154(b) by 0 days.

(21) Appl. No.: 16/054,430

(22) Filed: Aug. 3, 2018

(65) Prior Publication Data
US 2019/0039529 A1   Feb. 7, 2019

(30) Foreign Application Priority Data
Aug. 3, 2017   (CN) .......................... 2017 1 0655349

(51) Int. Cl.
| | |
|---|---|
| *B60R 11/00* | (2006.01) |
| *B60R 11/02* | (2006.01) |
| *F16M 13/02* | (2006.01) |
| *H04W 88/02* | (2009.01) |
| *H04B 1/06* | (2006.01) |
| *F16M 11/14* | (2006.01) |
| *H01Q 1/12* | (2006.01) |
| *H01Q 1/42* | (2006.01) |

(52) U.S. Cl.
CPC ......... *B60R 11/0241* (2013.01); *F16M 11/14* (2013.01); *F16M 13/022* (2013.01); *H01Q 1/125* (2013.01); *H01Q 1/1221* (2013.01); *H01Q 1/1271* (2013.01); *H04B 1/06* (2013.01); *H04W 88/02* (2013.01); *F16M 2200/022* (2013.01); *H01Q 1/42* (2013.01)

(58) Field of Classification Search
CPC .. B60R 11/0241; F16M 11/14; F16M 13/022; H01Q 1/1221; H01Q 1/125; H01Q 1/1271; H01Q 1/42; H04B 1/06; H04W 88/02
USPC ....................................................... 224/482
See application file for complete search history.

(56) References Cited

U.S. PATENT DOCUMENTS

| | | | | |
|---|---|---|---|---|
| 4,231,501 | A * | 11/1980 | Goode ...................... | B60R 9/12 211/70.5 |
| 7,475,858 | B2 * | 1/2009 | Kalis ................... | B60R 11/0258 248/205.5 |
| 8,215,596 | B2 * | 7/2012 | Duan ..................... | F16M 11/10 16/337 |

(Continued)

*Primary Examiner* — Peter N Helvey

(57) ABSTRACT

The present invention provides a window mounted wireless terminal apparatus, comprising a main body for receiving signals, a holder, and a rotary base, wherein the main body for receiving signals is mounted at one end of the rotary base, one other end of the rotary base is detachably connected to one end of the holder through a fastening assembly and is horizontally rotatable on the holder, and a fixing device used for being fixed on a window body is installed on one other end of the holder. According to the present invention, an angular orientation of the main body is positioned to accurately correspond to a wireless signal transmitting angle of an outdoor communication base station. The present invention has the advantages of strong capability for wireless signal receiving and convenience in adjustment and installation.

8 Claims, 4 Drawing Sheets

(56) References Cited

U.S. PATENT DOCUMENTS

| | | | | |
|---|---|---|---|---|
| 8,276,863 | B2* | 10/2012 | Niwai | B60R 11/0241 |
| | | | | 224/483 |
| 8,857,687 | B1* | 10/2014 | An | B60R 11/02 |
| | | | | 224/282 |
| 9,573,531 | B2* | 2/2017 | Zhang | B60R 11/02 |
| 2012/0205412 | A1* | 8/2012 | Choi | B60R 11/02 |
| | | | | 224/483 |
| 2013/0256355 | A1* | 10/2013 | Gatto-Weising | B60R 11/00 |
| | | | | 224/482 |

* cited by examiner

WINDOW MOUNTED WIRELESS TERMINAL APPARATUS

CROSS REFERENCE TO RELATED APPLICATIONS

The present application claims the benefit of Chinese Patent Application No. 201710655349.2 filed on Aug. 3, 2017. All the above are hereby incorporated by reference.

TECHNICAL FIELD

The present invention relates to the technical field of communication terminals, and particularly to a window mounted wireless terminal apparatus.

BACKGROUND

Communication users include individuals, businesses, industries and the like. In order to meet a wide variety of needs of user basic communication, business travel, family, entertainment and the like as well as usage scenarios, a wireless access terminal is required to provide a variety of forms of products, including the most basic types of terminals such as CPEs, cellphones, data cards, mobile hotspots, tablet computers, wireless communication modules, and the like.

A terminal product which is currently suitable for being used indoors by a user can only be adjusted and installed according to a fixed angle during installation, so that a final precise installation position of a device can not be predicted, and an orientation angle of the device can not accurately correspond to a wireless signal transmitting angle of the outdoor communication base station, resulting in weakened wireless signal receiving and transmitting capabilities of the terminal and thus performance loss of the product. Meanwhile, the indoor terminal product is of an omni-directional antenna design, which is limited by a volume factor of the terminal, so that the antenna gain can not be larger. However, the outdoor communication base station has a limited capability for wireless signal coverage, a wireless signal from an outdoor operator has a certain amount of attenuation when reaching indoors after passing through complex-lattice structures such as a window and a wall body, it is difficult to ensure effective communication between the indoor terminal product of the user and the base station; and with the limited field strength of the signal received by the indoor terminal, the wireless signal receiving and transmitting capabilities of the terminal are influenced. However, the outdoor terminal is of an orientation angle antenna design, which is not affected by a volume, so that the antenna gain may be larger. Although the problem of the field strength of the received signal can be solved, adjustment of the orientation angle in an installation process requires operation of a professional maintenance and commissioning personnel, so that an ordinary user can not easily install and maintain it.

SUMMARY

A technical problem to be solved by embodiments of the present invention is to provide a window mounted wireless terminal apparatus, which aims to solve problems of weak capability for wireless signal reception and inconvenience in installation in an existing terminal product.

An embodiment of the present invention is achieved by providing a window mounted wireless terminal apparatus, comprising a main body for receiving signals and a holder, and further comprising a rotary base, wherein the main body for receiving signals is mounted at one end of the rotary base, one other end of the rotary base is detachably connected to one end of the holder through a fastening assembly and is horizontally rotatable on the holder, and a fixing device used for being fixed on a window body is mounted on one other end of the holder.

Preferably, the holder comprises a stand platform and a fixing base which are perpendicularly fixed with respect to each other, wherein the fixing device is mounted on the fixing base, and the rotary base is connected onto the stand platform.

Preferably, one end of the fixing base is detachably connected to the stand platform in an inserting manner.

Preferably, the fixing device comprises a pressing knob and a suction cup, wherein one side of the suction cup is fixedly connected with a threaded rod, and the threaded rod is threadedly connected with the fixing base and then fixedly connected with the pressing knob.

Preferably, the rotary base has a semicircular ball head provided with a through hole, the stand platform has a semicircular groove provided with a circular hole, the ball head is rotatably accommodated within the groove, the fastening assembly comprises a fastening bolt and a fastening nut, and the fastening bolt is threadedly connected with the fastening nut after sequentially passing through the circular hole and the through hole.

Preferably, the fastening assembly further comprises a fastening knob with a countersunk hole, and a head end of the fastening bolt is installed within the countersunk hole.

Preferably, the through hole is a kidney hole.

Preferably, an insertion connector is provided on the rotary base, a slot is provided on the main body, the insertion connector is inserted within the slot, and the rotary base is detachably connected with the main body through a connector.

Preferably, the main body comprises a housing, a fixing pedestal, a high-gain planar antenna and a communication main board, wherein the high-gain planar antenna and the communication main board are disposed within the housing, the housing is mounted on the fixing pedestal, the fixing pedestal is fixedly connected with the rotary base through a connector, the slot is provided on the housing, the communication main board is mounted on the fixing pedestal, and the high-gain planar antenna is fixed on the communication main board.

Preferably, an LED display panel is provided on the main body.

Compared with the prior art, the present invention has the beneficial effects that the main body for receiving signal is installed on the rotary base which is locked on the holder through the fastening assembly and fixed on the window body by utilizing the fixing device on the holder, with loosening and tightening of the rotary base through the fastening assembly, adjustment of the orientation for the rotary base in the horizontal direction to be aligned to the radio frequency signal transmitting orientation of an out-of-window communication base station is achieved, and then the rotary base is locked by utilizing the fastening assembly to position the angular orientation of the main body, in order to be able to accurately correspond to the wireless signal transmitting angle of an outdoor communication base station; and the present invention has the advantages of strong capability for wireless signal reception and convenience in adjustment and installation.

DESCRIPTION OF THE EMBODIMENTS

In order to make objects, advantages and advantages of the present invention be more apparent, the present invention will be described in further detail with reference to accompanying drawings and embodiments. It should be understood that specific embodiments described herein are merely illustrative of the present invention and are not intended to limit the present invention.

Figure 1:
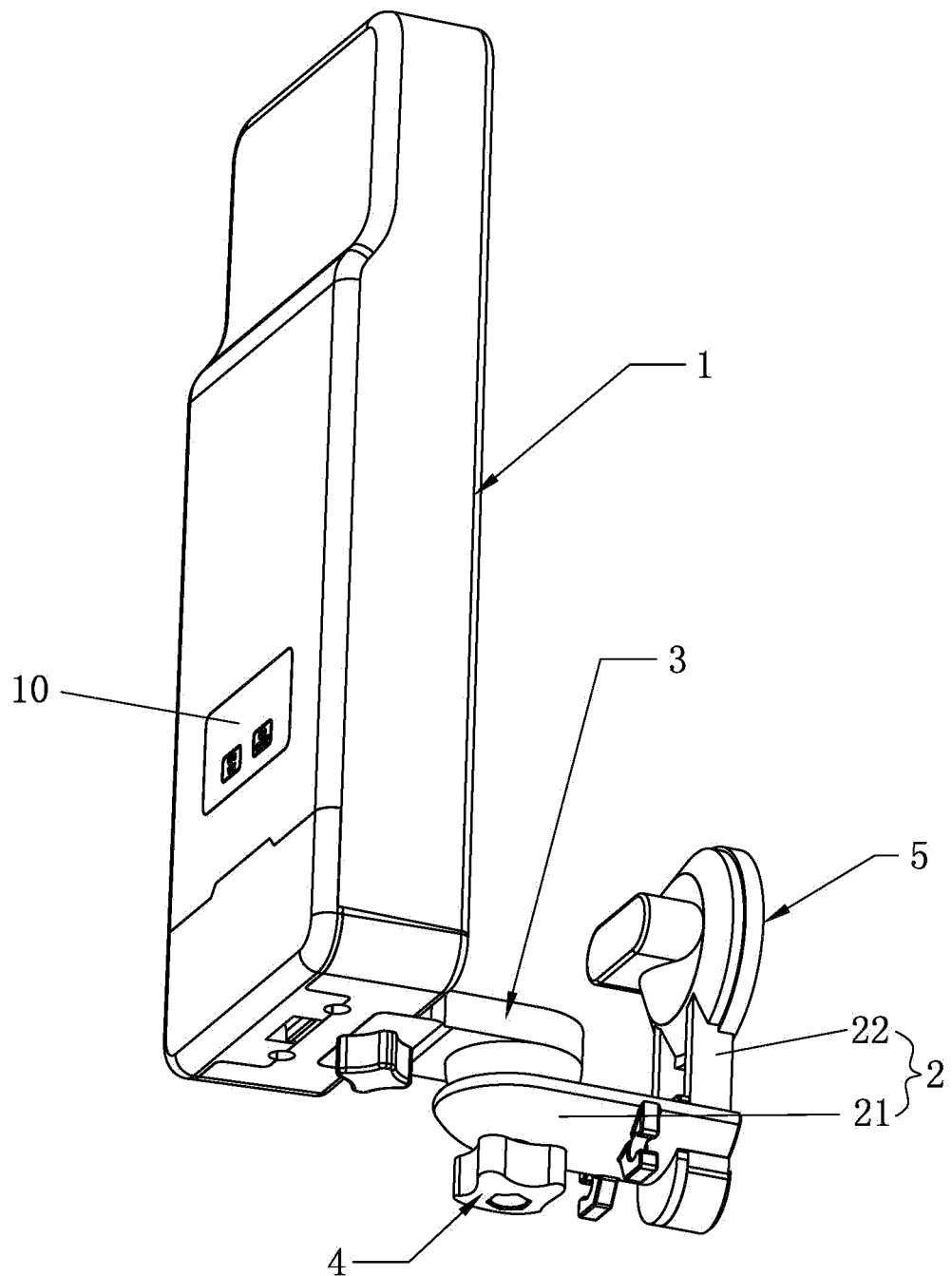
FIG. 1 is a perspective view schematically showing an overall structure of a window mounted wireless terminal apparatus according to an embodiment of the present invention.
Figure 2:
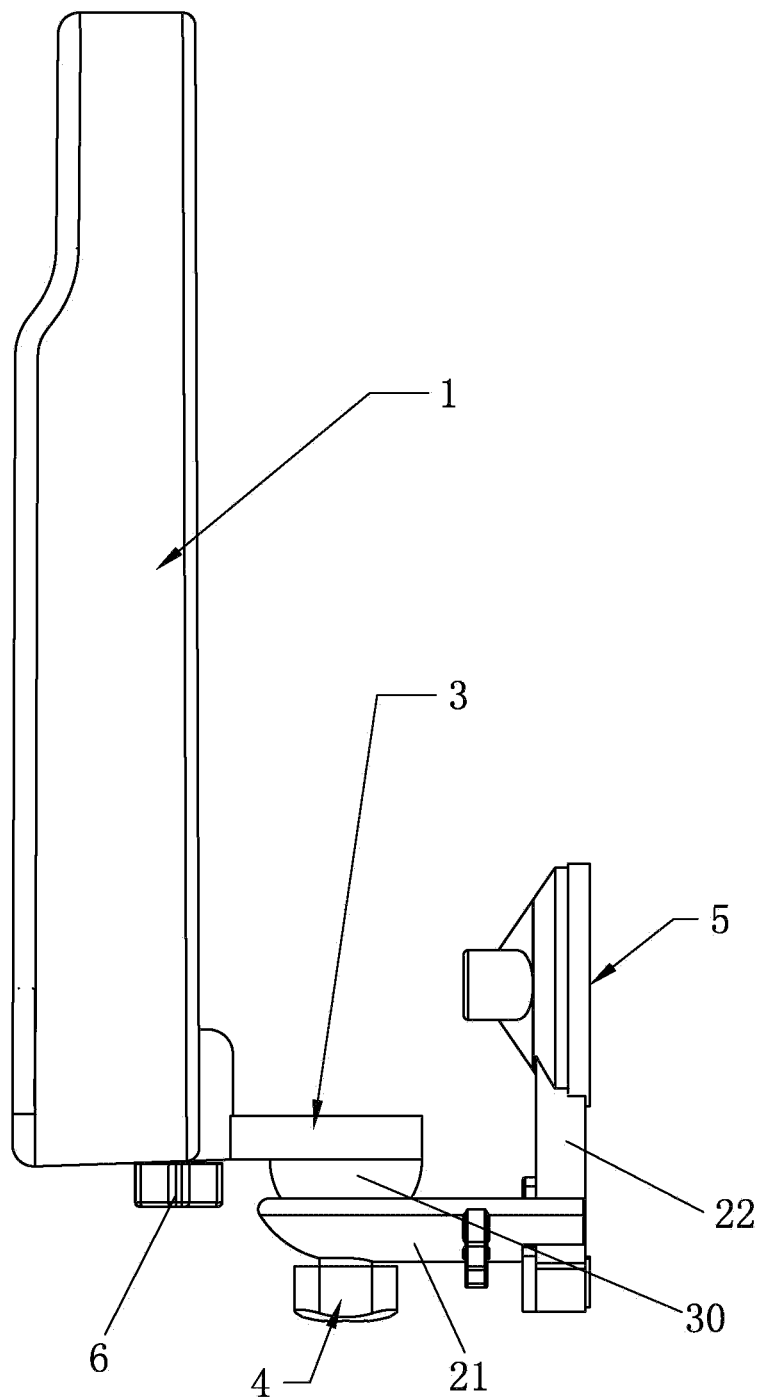
FIG. 2 is a side view schematically showing a structure of a window mounted wireless terminal apparatus shown in FIG. 1.
Figure 3:
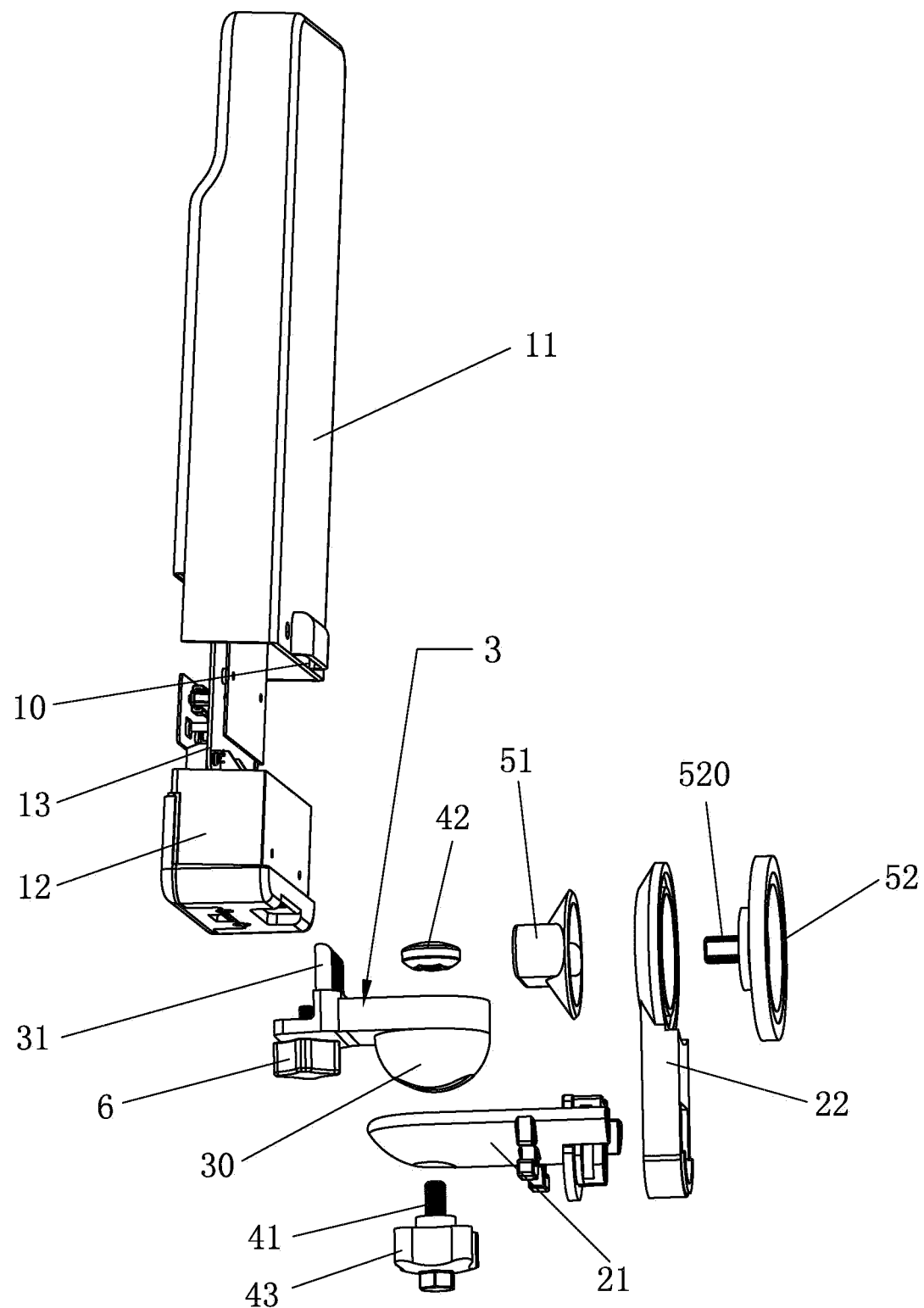
FIG. 3 is a exploded view schematically showing a structure of FIG. 1.
Figure 4:
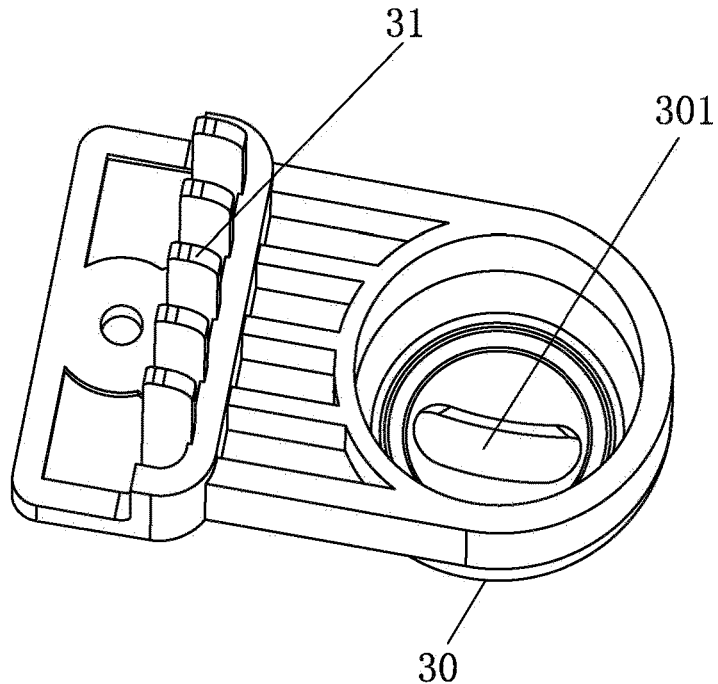
FIG. 4 is a perspective view schematically showing a structure of a rotary base in FIG. 3.
Figure 5:
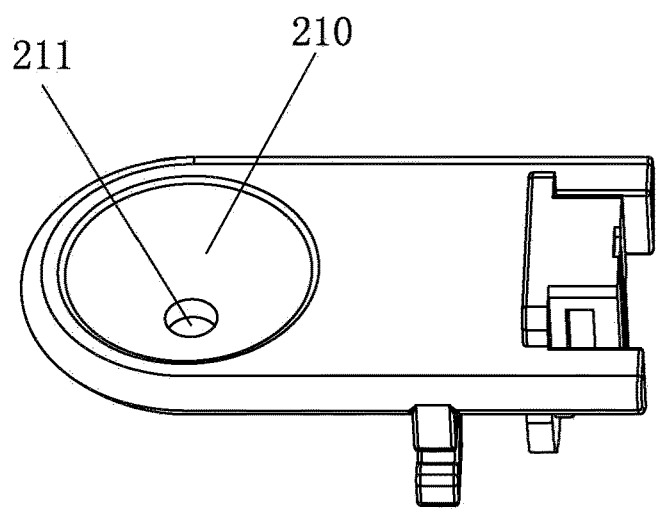
FIG. 5 is a perspective view schematically showing a structure of a stand platform in FIG. 3.

As shown in FIG. 1 to FIG. 5, there is provided a window mounted wireless terminal apparatus according to an embodiment of the present invention. The wireless terminal apparatus includes a main body 1 for receiving signals, a holder 2, and a rotary base 3. The main body 1 includes a housing 11, a fixing pedestal 12, a high-gain planar antenna (not shown in figures) used for converging radio frequency signals from a base station, and a communication main board 13 used for processing the radio frequency signals and performing wireless communication with the base station, the housing 11 is mounted on the fixing pedestal 12, and the high-gain planar antenna and the communication main board 13 are disposed within the housing, wherein the communication main board 13 is mounted on the fixing pedestal 12, and the high-gain planar antenna is fixedly mounted on the communication main board 13. An LED (Light-Emitting Diode) display panel 10 used for displaying a current operating state of the apparatus is provided on the main body 1. The rotary base 3 has one end with the main body 1 mounted thereat, and has one other end being detachably connected to one end of the holder 2 through a fastening assembly 4. With loosening and tightening of the rotary base 3 through the fastening assembly 4, the rotary base 3 is horizontally rotatable on the holder 2 to adjust a horizontal angular orientation of the rotary base 3. A fixing device 5 used for being fixed on a window body is mounted on an other end of the holder 2, and the fixing device 5 is fixed on the window body, so that the main body for receiving signals may receive the radio frequency signals from an out-of-window communication base station.

In the above embodiment, the holder 2 includes a stand platform 21 and a fixing base 22 which are perpendicularly fixed with respect to each other. The fixing device 5 is mounted on the fixing base 22, and the rotary base 3 is connected onto the stand platform 21. Particularly, the fixing base 22 has a lower end detachably connected to the stand platform 21 in an inserting manner, and an upper end with the fixing device 5 detachably mounted thereat. An insertion connector 31 provided on the rotary base 3 is inserted within a slot 10 provided on the housing 11 of the main body 1. The rotary base 3 is detachably connected with the fixing pedestal 12 on the main body 1 through a connector 6, so that the main body 1 is detachably and stably mounted on the rotary base 3 for convenience of installation and dismantlement.

In the above embodiment, the fixing device 5 is a suction cup device which is sucked on the window body in a suction manner, and includes a pressing knob 51 and a suction cup 52, wherein one side of the suction cup 52 is fixedly connected with a threaded rod 520, the threaded rod 520 is threadedly connected with the fixing base 22 and then fixedly connected with the pressing knob 51. In this way, after the suction cup 52 is pressed on a smooth window surface, air within the suction cup 52 is exhausted with rotating and screwing of the pressing button 51 so that the suction cup 52 is firmly sucked on the window body.

In the above embodiment, the rotary base 3 has a semicircular ball head 30 being rotatably accommodated within a semicircular groove 210 provided on the stand platform 21. A through hole 301 is provided on the ball head 30 of the rotary base 3, and a circular hole 211 is provided on the groove 210 on the stand platform 21. The fastening assembly 4 comprises a fastening bolt 41, a fastening nut 42, and a fastening knob 43 with a countersunk hole (not shown), and a head end of the fastening bolt 41 is installed in the countersunk hole. The fastening bolt 41 is threadedly connected with the fastening nut 42 after sequentially passing through the countersunk hole of the fastening knob 43, the circular hole 211 and the through hole 301. In this way, the fastening knob 43 is tightened so as to fasten the rotary base 3 onto the stand platform 21. The rotary base 3 is horizontally rotated by unscrewing the fastening knob 43 when adjustment of a horizontal angle for the rotary base 3 is required. In the present embodiment, the through hole 301 in the ball head 30 is a kidney hole, and a direction in which the kidney hole is provided coincides with a lengthwise direction of the rotary base 3. The fastening bolt 41 is disposed in the kidney hole by passing through the kidney hole, which allows the rotary base 3 to be rotatable within a vertical plane. The main body 1 is horizontally and vertically rotated with rotation of the rotary base 3 for adjusting an orientation angle of the main body 1 to an optimum position. According to the above-described window mounted wireless terminal apparatus, an installation angle of the main body 1 is steplessly adjustable, and the performance loss of the product due to the misalignment is effectively avoided.

As described above, according to the present invention, the main body 1 is fixedly mounted on the window body by the suction cup 52, and a horizontal angle and a vertical angle of the main body 1 are adjusted to appropriate angles, particularly, an orientation angle of the main body 1 accurately corresponds to a wireless signal transmitting angle of an outdoor communication base station. Radio frequency signals from the out-of-window base station are converged by the high-gain antenna within the main body 1 and then directed to a radio frequency receiving point of the communication main board, and the communication main board processes the radio frequency signals and performs wireless communication with the base station. The present invention has the advantages of strong capability for signal reception, convenience in installation and adjustment as well as convenience in dismantlement.

The foregoing is merely illustrative of preferred embodiments of the present invention and is not intended to limit the present invention, and any modifications, equivalent substitutions and improvements within the spirit and principles of the present invention are intended to be encompassed within a protective scope of the present invention.

What is claimed is:

1. A window mounted wireless terminal apparatus, comprising a main body for receiving signals and a holder, and further comprising a rotary base, wherein the main body for receiving signals is mounted at one end of the rotary base, one other end of the rotary base is detachably connected to one end of the holder through a fastening assembly and is horizontally rotatable on the holder, and a fixing device used for being fixed on a window body is mounted on one other end of the holder;

the holder comprises a stand platform and a fixing base which are perpendicularly fixed with respect to each other, the fixing device is mounted on the fixing base, and the rotary base is connected onto the stand platform;

the rotary base has a semicircular ball head provided with a through hole, the stand platform has a semicircular groove provided with a circular hole, the ball head is rotatably accommodated within the groove, the fastening assembly comprises a fastening bolt and a fastening nut, and the fastening bolt is threadedly connected with the fastening nut after sequentially passing through the circular hole and the through hole.

2. The window mounted wireless terminal apparatus according to claim 1, wherein one end of the fixing base is detachably connected to the stand platform in an inserting manner.

3. The window mounted wireless terminal apparatus according to claim 1, wherein the fixing device comprises a pressing knob and a suction cup, wherein one side of the suction cup is fixedly connected with a threaded rod, and the threaded rod is threadedly connected with the fixing base and then fixedly connected with the pressing knob.

4. The window mounted wireless terminal apparatus according to claim 1, wherein the fastening assembly further comprises a fastening knob with a countersunk hole, and a head end of the fastening bolt is installed within the countersunk hole.

5. The window mounted wireless terminal apparatus according to claim 1, wherein the through hole is a kidney hole.

6. The window mounted wireless terminal apparatus according to claim 1, wherein an insertion connector is provided on the rotary base, a slot is provided on the main body, the insertion connector is inserted within the slot, and the rotary base is detachably connected with the main body through a connector.

7. The window mounted wireless terminal apparatus according to claim 6, wherein the main body comprises a housing, a fixing pedestal, a high-gain planar antenna and a communication main board, wherein the high-gain planar antenna and the communication main board are disposed within the housing, the housing is mounted on the fixing pedestal, the fixing pedestal is fixedly connected with the rotary base through a connector, the slot is provided on the housing, the communication main board is mounted on the fixing pedestal, and the high-gain planar antenna is fixed on the communication main board.

8. The window mounted wireless terminal apparatus according to claim 1, wherein an LED display panel is provided on the main body.

* * * * *